July 22, 1969    CHENG SHIH    3,457,437
CONTINUOUS FRACTIONAL VAPORIZER FOR USE IN A CLOSED LOOP
MPD GENERATION SYSTEM
Filed Jan. 4, 1965    2 Sheets-Sheet 1

INVENTOR
CHENG SHIH

BY *Sughrue, Rothwell, Mion,
Zinn & Macpeak*
ATTORNEYS

United States Patent Office 3,457,437
Patented July 22, 1969

3,457,437
CONTINUOUS FRACTIONAL VAPORIZER FOR USE IN A CLOSED LOOP MPD GENERATION SYSTEM
Cheng Shih, Baltimore, Md., assignor, by mesne assignments, to Teledyne, Inc., Los Angeles, Calif., a corporation of Delaware
Filed Jan. 4, 1965, Ser. No. 423,104
Int. Cl. G21d 7/02
U.S. Cl. 310—11         7 Claims

ABSTRACT OF THE DISCLOSURE

A heat exchanger for vaporizing a fluid characterized by means for changing pressure head of the fluid being vaporized to velocity head as it flows therethrough. In the preferred embodiment, a heat exchange wall is formed in the shape of one-half of a hyperboloid providing a central flow passage for the vaporizable fluid of decreasing cross-sectional area in the direction of flow. The inner surface of the wall is serrated to form a continuous helical channel with runs of gradually increasing width. The vaporizable fluid is tangentially introduced in line with the top serrated channel. A heating fluid flows in the same general direction as the vaporizable fluid in contact with the outer surface of the wall.

---

Figure 1:
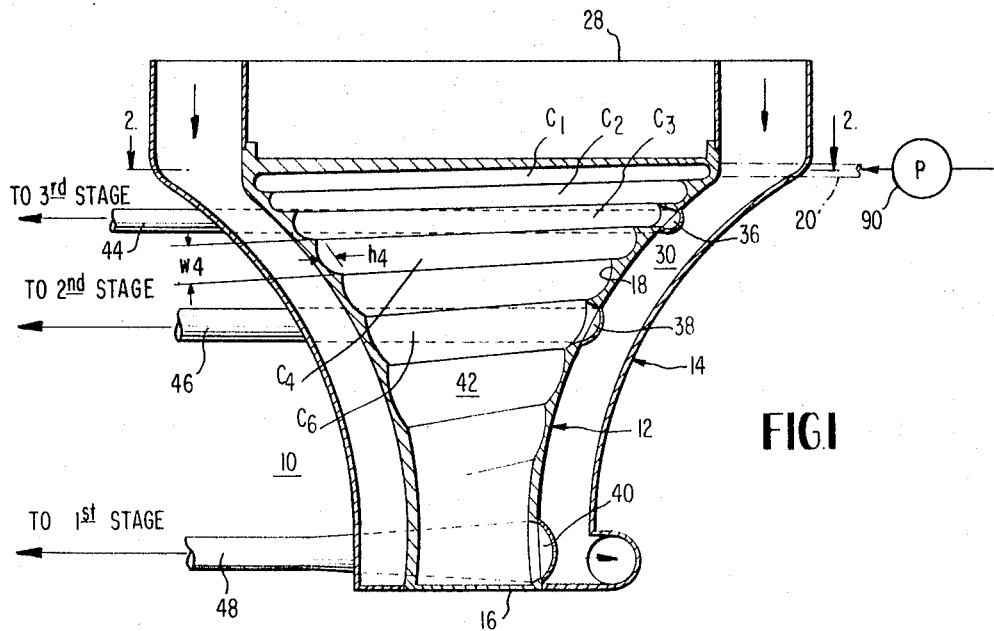

This invention relates to a heat exchanger for deriving the most kinetic energy from the sensible heat of a high temperature exhaust stream for subsequent use in a mechanical system including a multistage jet compressor and more particularly to such a heat exchanger in the form of a continuous fractional vaporizer.

In copending application S.N. 488,833 entitled, "Closed System Magnetoplasmadynamic Electrical Power Generation," filed Sept. 1, 1965, the MPD working medium is continuously circulated at relatively high temperature and is repressurized by passing the high temperature MPD exhaust stream through a single or multiple stage jet compressor, whereby the energy transfer from the primary or driving fluid to the secondary or working medium effects desired repressurization of the working medium. The primary or driving fluid of the jet compressor is also continuously recirculated and by the use of one or more heat exchangers, the primary driving fluid receives most of its kinetic energy from the sensible heat of the high temperature working medium exhaust stream.

The present invention is directed to a continuous fractional vaporizer which may advantageously form one or more of the heat exchangers for use in a closed MPD electrical power generation system of the above-identified patent application. The principle of operation of the continuous fractional vaporizer of the present invention is based upon the fact that the heat of vaporization of liquids, especially a liquid metal, decreases at increasing pressures. Thus, it requires less heat to vaporize and superheat a given rate of flow at a higher pressure than it would require at a lower pressure. However, higher pressure vaporization means higher saturation temperature. This may be seen from the following.

Let:
A = cross-sectional area, meter$^2$
$C_p$ = specific heat at constant pressure, joules/kg. ° K
$h_v$ = heat of vaporization, joules/kg.
$\dot{m}_g$ = mass flow rate of gas, kg./sec.
$\dot{m}_p$ = mass flow rate of primary vapor stream, kg./sec.
$\rho$ = mass density, kg./meter$^3$
$u$ = velocity of flow, meter/sec.
$P_L$ = liquid pressure, newtons/meter$^2$ $T_{gi}$ = the temperature of the hot gas coming into the heat exchanger, ° K.
$T_{pl}$ = the maximum temperature of the superheated vapor, ° K.
$T_{pv}$ = the saturation temperature of the vapor, ° K.
$\theta$ = temperature drop across heat exchanger wall, ° K.

The heat released from the gas stream is therefore equal to the formula shown at (1).

$$= \dot{m}_g C p_g (T_{gi} - T_{pv} + \theta) \quad (1)$$

The heat received by the vapor is equal to the equation shown $$= \dot{m}_p [C p_p (T_{pl} - T_{pv}) + h_v] \quad (2)$$

Under steady equilibrium running conditions, the Equation 3 as shown $$= \dot{m}_g C_{pg}(T_{gi} - T_{pv} - \theta)$$
$$= \dot{m}_p [C_{pp}(T_{pl} - T_{pv}) + h_v] \quad (3)$$

By vaporizing it at a higher pressure, the saturation temperature $T_{pv}$ will increase while the heat of vaporization $h_v$ will decrease. This will cut down the heat requirement on the vapor side per kg. of vapor formation.

Let:

$$\frac{\dot{m}_p}{\dot{m}_g} = r$$

then $$C_{pg}(T_{gi} - \theta) = r[C_{pv}(T_{pl} - T_{pv}) + h_v] \quad (4)$$

By vaporizing at higher pressure on the liquid side, the saturation temperature of vapor, $T_{pv}$, will be increased corresponding to the saturation temperature and the heat of vaporization, $h_v$, will be decreased so that the heat requirement on the vapor side is reduced for the same mass flow rates ratio $r$. But from (1) the heat supply from the gas side will also be reduced because of the higher saturation temperature of the vapor $T_{pv}$ value. Thus, there is an optimum pressure at which a fixed rate of liquid may be vaporized and superheated to fixed temperature with minimum heat supply from the gas side. However, if the rate is reduced, the higher the pressure the lesser the amount of heat energy is required per unit mass flow on the liquid side. The most ideal case is, therefore, a fractional vaporization system in which a small portion of the liquid flow is vaporized at continuously decreasing pressure.

It is a primary object of the invention to provide an improved continuous fractional vaporizer in which a small portion of liquid flow is vaporized at continuously decreasing pressure to provide maximum heat exchange efficiency.

It is a further object of this invention to provide an improved continuous fractional vaporizer which may be advantageously used to derive the most kinetic energy from the sensible heat of a high temperature MPD working medium exhaust stream.

It is a further object of this invention to provide an improved continuous fractional vaporizer which may be used most advantageously to derive its maximum kinetic energy for a jet compressor primary driving fluid from the sensible heat of a high temperature MPD working medium exhaust stream.

Further objects of this invention will be pointed out in the following detailed description and claims and illustrated in the accompanying drawings which disclose, by way of example, the principle of this invention and the best mode which has been contemplated of applying that principle.

Figure 2:
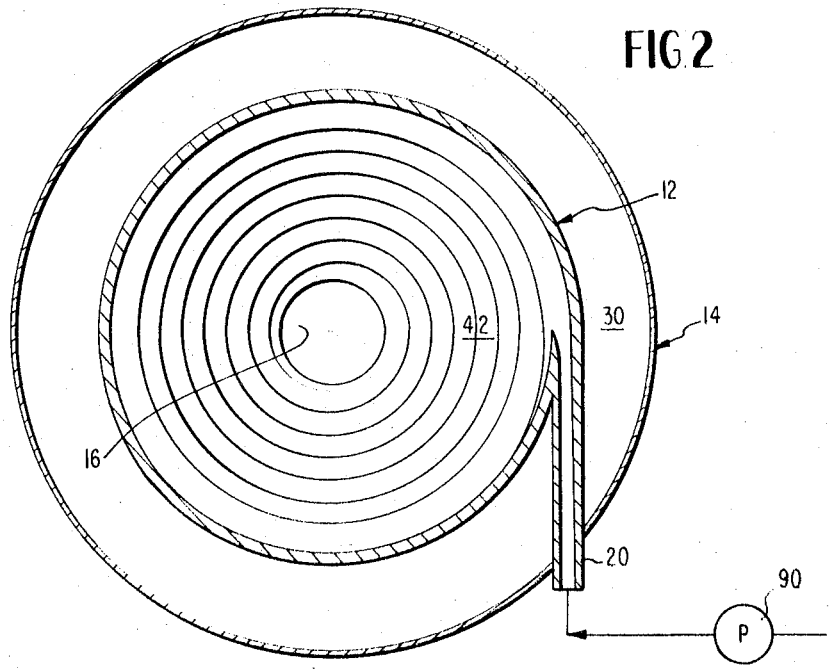

In the drawings:
FIGURE 1 is a sectional, schematic elevation of one embodiment of the continuous fractional vaporizer of the present invention.
FIGURE 2 is a plan view, in section, taken along lines 2—2 of FIGURE 1 of the apparatus shown in FIGURE 1.

Figure 3:
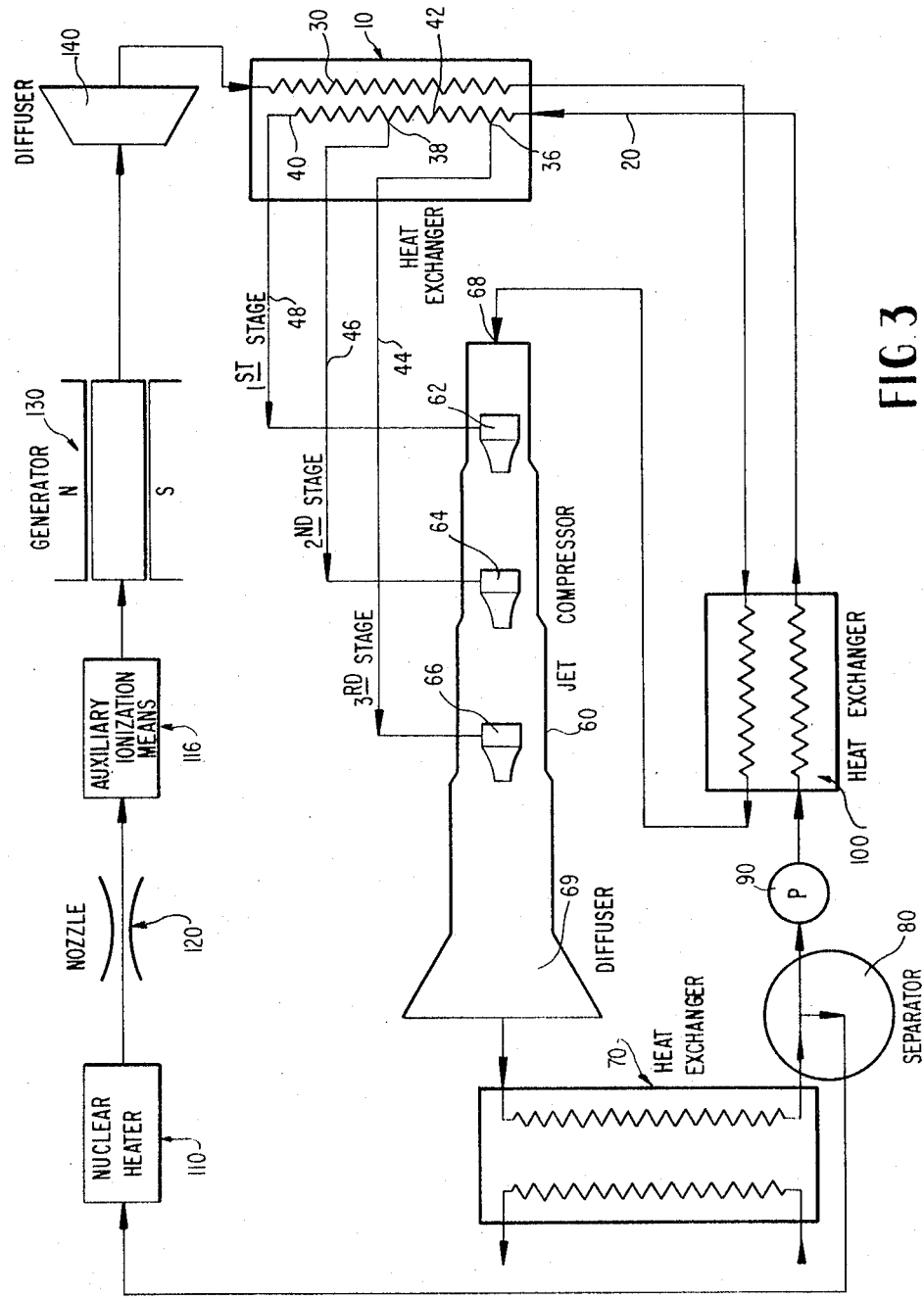

FIGURE 3 is a schematic view of a closed loop MPD generator system employing the continuous vaporizer of the present invention.

In general, the present invention comprises a continuous fractional vaporizer having a heat exchange wall in the form of one half of a hyperboloid providing a central flow passage of decreasing cross-sectional area in the direction of flow. A high pressure liquid is directed tangentially into the inlet of the central flow passage and a second heat exchange fluid which may be a high temperature gas is directed concurrently along the outer surface of the heat exchanger wall, whereby the heat passing through the heat exchange wall tends to vaporize the liquid with the pressure head of the vapor changing to velocity heat in the direction of flow to ensure continuous vaporization at maximum heat exchange efficiency.

The continuous fractional vaporizer advantageously forms one or more heat exchangers in a closed loop MPD generator system in which the generator exhaust vaporizes and superheats the driving fluid of a jet compressor acting to repressurize the generator loop working medium.

One embodiment of the present invention utilizing the principles of vaporization of a small portion of liquid flow at continuously decreasing pressure to provide a fractional vaporization system is shown as a preferred embodiment in FIGURES 1 and 2. The fractional vaporizer is of the shape of one half of a hyperboloid converging toward the exit. While the heat exchanger is shown schematically, the operation under the principles enumerated above is readily apparent. The vaporizer 10 includes a pair of spaced wall members 12 and 14, with wall 12 formed of a material, such as metal having the high coefficient of thermal conduction, wall 12 and preferably wall 14 being in the shape of one half of a hyperboloid, converging toward the exit end 16 of the assembly. The inner wall 12 has an inner serrated surface 18 which forms a continuous helical channel with runs of gradually increasing width but decreasing depth. The helical channel is provided on the inner surface of the wall for guiding the liquid flow. The liquid flow within the channel occupies an area indicated, for instance, in the fourth circular run $C_4$ by the width $w4$ and the height $h4$. Liquid at high pressure is directed to the vaporizer through conduit 20 after being pressurized by a conventional electromagnetic or mechanical pump 90. The highly pressurized liquid enters the vaporizer tangentially in line with the first or top channel run $C_1$ and is helically guided toward the exit end 16 along the channel wall. Vaporization of the liquid occurs as the result of heat transfer from the high temperature gas which is directed into an annular cavity 30 formed between the spaced walls 12 and 14 at the inlet end 28 of the assembly.

The continuous fractional vaporizer, as mentioned previously, has specific application to a MPD closed electrical generation system in which the working medium which is exhausted from the generator at high temperature and high velocity may be directed to the inlet end 28 of the vaporizer 10. A portion of the liquid within the helical channel will be vaporized at a pressure ($<P_1$) equal to the equilibrium pressure of the fluid corresponding to the temperature of the shell. As the heat is being used to vaporize the liquid, the gas temperature, consequently the shell temperature of shell 12 reduces gradually toward the exit. At the same time, the pressure in the vaporizer reduces gradually toward the throat since, as a result the helical path, and the hyperbolic configuration, pressure head changes to velocity head. It is readily apparent, therefore, that the vaporization process continues at gradually decreasing pressure. The cross-sectional area at each axial position may be determined from the continuity equation $$\dot{m} = \rho u A$$

and the energy balance equation $$\dot{m}_\kappa \int_T^{T_{gi}} C_v dT = \int_{T-\theta}^{T_{gi}-\theta} hv(T) d\dot{m}(T)$$

For most liquid metal, the heat of vaporization is a linear function of the equilibrium temperature. The function of rate of vaporization of the fluid should be established by method of iteration. In using the continuous fractional vaporizer as a portion of a closed MPD electrical generation system, the liquid metal being pumped at high pressure to tangential inlet 24, may comprise a metal of very low ionization potential, such as cesium.

The continuous fractional vaporization process employing the heat exchanger of the configuration shown, as stated previously, may be most profitably employed in conjunction with a jet compressor and a closed loop MPD electrical power generation system where the exhaust from the MPD generator is generally at fairly high temperatures. The sensible heat of the exhaust may be used in a heat exchanger of the type shown in the drawings to vaporize and superheat another high pressure fluid, say liquid cesium, as the primary or driving stream of the jet compressor. The exhaust itself, after passing through the vaporizer or vaporizers, forms the secondary of driven stream of the jet compressor. Referring to FIGURE 3, the high pressure primary stream is injected into the jet compressor 60 through one or more expansion nozzles 62, 64 and 66 to change its pressure energy into velocity (kinetic) energy. The high velocity primary stream entrains with it the secondary stream entering inlet 68 to a mixing chamber where a momentum transfer takes place. A pressure rise follows when the mixture is slowed down through a diffusion process at diffuser 69. The mixture is then separated by condensation in heat exchanger 70, the condensate is separated at 80 and is pumped to a much higher pressure by pumping means 90 back to the vaporizers 50 and 100 and the gas is recirculated through the heater 110, nozzle 120, auxiliary ionization means 116 and the generator 130 to perform useful work. Very efficient usage of the exhaust heat is a necessity in such applications because jet compressors are very inefficient devices and conventional efficient mechanical compressors are not compatible to the high temperatures involved or the durability and reliability required when nuclear energy is used as the prime heat source.

When more than one stage is to be used in the jet compressor, the different stages of the compressor may be operated at different primary pressures as a result of the step vaporization process.

The continuous fractional vaporizer shown in FIGURES 1 and 2 may be most advantageously used in such a system. In such a case, a single heat exchange structure involving a single pass for the high temperature exhaust working medium, such as helium, is provided. The exhaust of the MPD generator may move through chamber 30 formed by spaced walls 12 and 14 as indicated in FIGURE 3. Since the primary driving fluid of the jet compressor 60 is delivered to the various first stage, second stage and third stage nozzles 62, 64 and 66, respectively, at varying pressure, suitable taps are provided at 36, 38 and 40 along the length of the second heat exchange passage indicated schematically at 42 within heat exchanger 10 in FIGURE 3, the path corresponding to the runs $C_1$, $C_2$, etc., formed by the serrated surface 18 along the inner wall of the hyperbolic heat exchange wall 12. By referring to FIGURE 1, it is seen that the first tap-off point occurs at the end of run $C_3$ as indicated at 36, the tap-off point being a recess 36 formed within the run, coupled to a conduit 44 which is connected directly to the third stage nozzle 66.

In sequence, at run $C_6$, there is provided a second tap-off point in the form of a recess 38 while is coupled to the second stage conduit 46 for delivering vaporized, superheated driving fluid to the second stage nozzle 64. At the exit end 16 of the heat exchanger, there is provided a third tap or collecting recess 40 which acts to receive and deliver the remaining vaporized, superheated driving fluid through first stage conduit 48 to the first stage nozzle 62 of the jet compressor 60. From the previous description, it is obvious that the first stage nozzle 62 receives vaporized, superheated driving fluid in the closed loop MPD system cesium, which is at a lower pressure than the vaporized, superheated driving fluid received by the second and third stage nozzles. This is readily apparent since the pressure head has changed to velocity head due to the hyperbolic surface configuration of the heat exchanger. Further, the heat exchanger advantageously changes the pressure head to velocity head for the concurrent flowing driving fluid while the MPD exhaust working medium passing through heat exchange passage 34 has its temperature gradually reduced due to heat transfer through wall 12. Thus, continual step vaporization occurs for the jet compressor driving fluid. By tapping off a portion of the driving fluid, moving in a helical path, along the serrated inner surface of wall 12, vaporized, superheated driving fluid is delivered at desired decreasing pressures to supply the jet compressor nozzles in inverse order of tapping.

As a result, the high pressure vapor can be extracted at different pressure levels and superheated so that each extracted position of the vapor can be expanded, after superheating, in a divergent nozzle to act as the primary stream of one stage of a multistage jet compressor for higher pressure ratios of the secondary gas stream.

While there has been described the application of the continuous vaporizer to a closed loop MPD system in which the heat exchanger is employed immediately behind diffuser 140 and prior to delivery of the working medium to the jet compressor, the system shown makes use of a second heat exchanger 100. This second heat exchanger may either be conventional or may be of the type shown in FIGURES 1 and 2, but having a single collector at the outlet, In this case, the intermediate taps are eliminated.

In addition, while the continuous fractional vaporizer is advantageously used in a closed loop MPD system, its use is not intended to be limited to such a system and in fact, may be used in applications with fluids other than liquid metals, wherein it is desirable to effect continuous fractional vaporization and/or superheating of a high pressure liquid through heat exchange. The closed loop MPD electrical power generation system described herein is otherwise conventional.

While there have been shown and described and pointed out the fundamental novel features of the invention as applied to a preferred embodiment, it will be understood that various omissions and substitutions and changes in the form and detail of the system illustrated and in its operation may be made by those skilled in the art without departing from the spirit of the invention. It is the intention, therefore, to be limited only as indicated by the scope of the following claims.

What is claimed is:

1. A continuous fractional vaporizer comprising: a tubular heat exhange wall having opposed heat exchange surfaces the inner surface of said wall including a continuous helical channel of gradually increasing width along its length, means for passing a first high pressure liquid along said channel from an inlet area of relatively high pressure to an exit area spaced therefrom at reduced pressure, and means for passing a second high temperature fluid along the other surface of said heat exchanger wall in a concurrent direction, whereby heat passing through said wall from said second fluid acts to continuously vaporize said first liquid at maximum heat exchange efficiency.

2. A continuous fractional vaporizer comprising: a heat exchange wall in the form of one half of a hyperboloid providing a central flow passage of decreasing cross-sectional area in the direction of flow, means for passing a first high pressure liquid through said central flow passage, means for passing a second high temperature fluid along the outer surface of said heat exchanger wall in a concurrent direction whereby heat passing through said wall tends to vaporize said high pressure liquid with said vapor pressure head changing to velocity head in the direction of flow to effect continuous vaporization of said high pressure liquid at maximum heat exchange efficiency.

3. The device as claimed in claim 2 wherein said hyperbolic heat exchange wall includes a fluted helical channel formed along said inner surface with succeeding runs of said fluted channel in the direction of flow being of increasing width, and wherein said means for passing said high pressure liquid through said central flow passage includes means for directing the high pressure liquid tangentially into said flow passage at said inlet in line with said first helical channel run.

4. The device as claimed in claim 2 further including means for tapping the fluid passing along the inner wall of said heat exchanger at locations spaced axially from said inlet toward said outlet whereby segregated portions of said first fluid may be delivered from said continuous fractional vaporizer in vaporized form at different pressures.

5. In a continuous fractional vaporizer for use in a magnetoplasmadynamic closed electrical power generation system having a power generator, means for passing a high temperature, high velocity, ionized working medium through said generator whereby a portion of the kinetic and thermal energy of the ionized working medium is converted to electrical form, a jet compressor including a secondary fluid inlet and a primary fluid discharge nozzle, means for directing the exhaust working medium from the generator to said compressor secondary fluid inlet, a source of high pressure liquid forming the jet compressor primary fluid and means for directing said high pressure fluid to said jet compressor primary fluid discharge nozzle, the improvement comprising: a heat exchanger operatively positioned between said generator and said jet compressor including a heat exchange wall, means for passing the high pressure jet compressor primary liquid along one surface of the heat exchange wall from an area of relatively high pressure to an exit area spaced therefrom of reduced pressure, said heat exchanger further including means for passing said high temperature generator exhaust working medium along the other surface of said heat exchange wall in a concurrent direction whereby heat passing through said wall acts to vaporize said high pressure liquid with the pressure head of said vapor changing to velocity head in the direction of flow whereby said high pressure, jet compressor primary liquid is continuously vaporized within said heat exchanger.

6. The system as claimed in claim 5 wherein said heat exchange wall is in the form of one half of a hyperboloid providing a central flow passage for said high pressure primary driving fluid of said jet compressor and said heat exchanger further includes means for directing said high pressure liquid tangentially into the inlet of said flow passage.

7. The system as claimed in claim 5 further including means for tapping the fluid passing along the inner wall of said heat exchanger at locations spaced axially from said inlet toward said outlet whereby segregated portions of said first fluid may be delivered from said continuous fractional vaporizer in vaporized form at different pressures.

References Cited

UNITED STATES PATENTS 2,445,115   7/1948   Hanrahan _____ 165—156 X

DAVID X. SLINEY, Primary Examiner

U.S. Cl. X.R.

165—156, 164